2,976,063
COUPLING ADAPTER

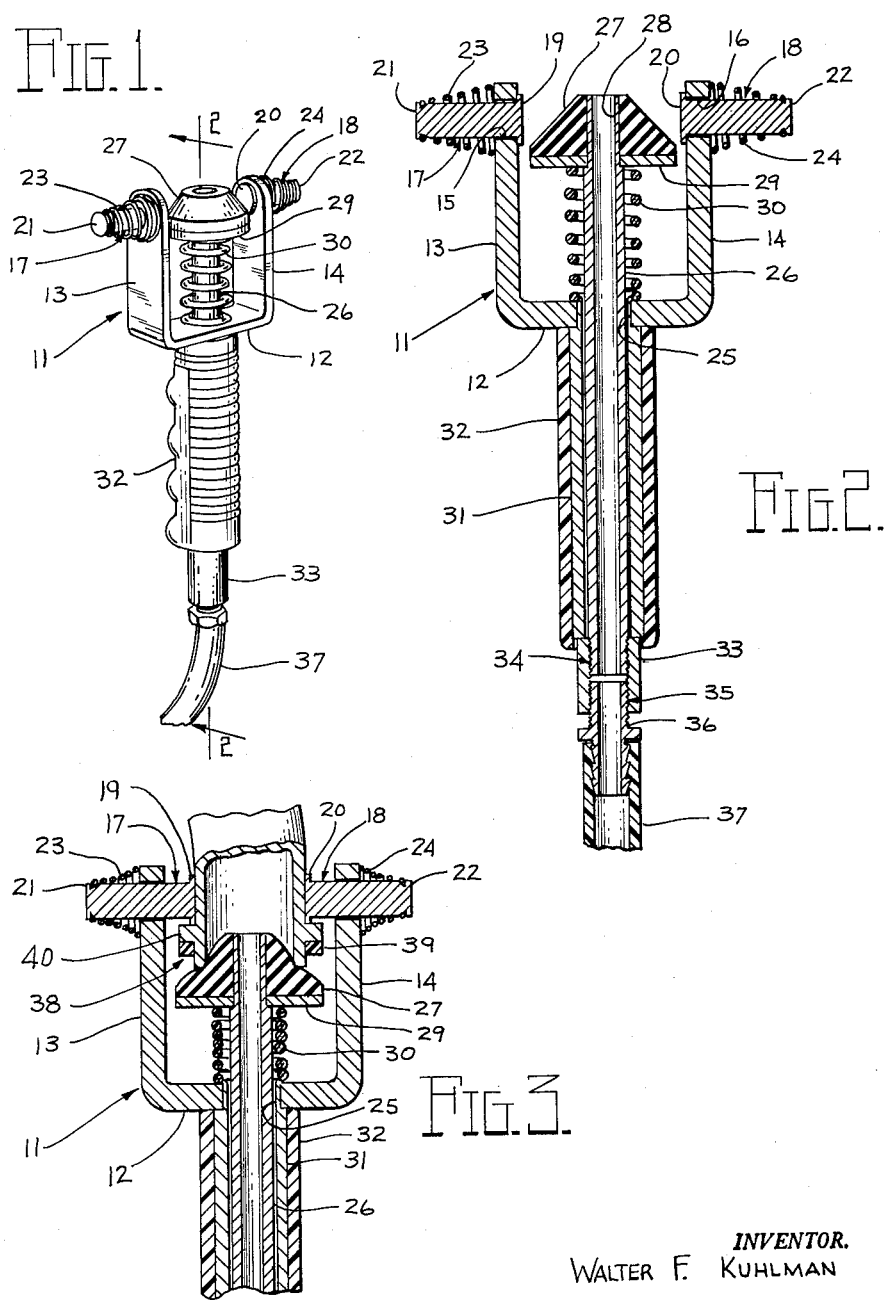

Walter F. Kuhlman, 99 Corwin St., Norwalk, Ohio

Filed Oct. 23, 1959, Ser. No. 848,328

3 Claims. (Cl. 285—119)

This invention relates to a coupling device, and more particularly relates to a device for forming a coupling between separate tubular sections and specifically for adapting various instruments and the like for temporary connection to a fluid flow system.

It is sometimes necessary to check permanently installed conduit or piping systems for leaks or other failures. For example, in the usual residential dry gas supply system, a gas supply pipe leads from a main into a gas meter located in the house from which the gas is piped to various gas appliances. In checking such a system for leaks, it is necessary that both the service line (meter to street) and house line be examined. One method of checking these lines is to connect a pressure gauge sequentially to both lines at their respective pipe unions with the meter inlet and outlet conduits. It will be appreciated that a variety of different size and type pipe unions will be encountered, which, of course, pose a difficult problem in providing suitable couplings or coupling adapters for connecting pressure gauges and the like thereto.

The instant invention is based upon the discovery of an improved coupling adapter which is particularly useful in making the connections necessary in testing gas lines.

It is, therefore, the principal object of the invention to provide a substantially universal coupling adapter.

It is a further object of the invention to provide a coupling adapter which is compact in structure, which can be manufactured at a reasonable price, and which is designed in such a manner that all parts are easily replaceable.

Another object of the invention is to provide a coupling adapter that can be installed or connected within a few seconds to establish and maintain an efficient connection which is fluid-tight at relatively high pressures.

Other objects and advantages of the invention will be in part apparent, and will in part appear hereinafter.

For a better understanding of the nature and objects of the invention, reference should be had to the following detailed description and drawing, illustrating a preferred embodiment thereof, in which:

Fig. 1 is a view in perspective of a coupling adapter in accordance with the present invention;

Fig. 2 is a vertical sectional view, slightly enlarged, taken along the line 2—2 of Fig. 1; and Fig. 3 is a fragmentary vertical sectional view illustrating the coupling adapter in engaged position with one section of a pipe union.

Referring now in more detail to the drawings, and to Fig. 2 in particular, the coupling adapter in accordance with the invention comprises a generally U-shaped frame indicated generally at 11 having a base member 12 and a pair of arms 13 and 14 extending upwardly at generally right angles therefrom. The arms 13 and 14 are provided with bores 15 and 16 respectively adjacent their free ends in which a pair of pins, indicated generally at 17 and 18, are slidably mounted.

The ends of the pins 17 and 18 extending into the interior of the U-shaped frame 11 are provided with flanged surfaces 19 and 20. These flanged surfaces may have any desired shape so long as their peripheral dimensions are such as to prevent their movement through the bores 15 and 16. The outer ends of the pins 17 and 18 are also provided with flanged surfaces 21 and 22, which surfaces are effective to form abutments or retaining means for a pair of helical springs 23 and 24. The springs are confined between the flanges 21 and 22 and the outer surfaces of the arms 13 and 14 adjacent the bores 15 and 16, and resiliently urge the pins 17 and 18 radially outwardly to a position in which they are substantially completely withdrawn from the interior of said frame. The flanged surfaces 19 and 20 are effective as stop means when the pins are in their normal withdrawn position to prevent further outward movement thereof.

The base member 12 of the U-shaped frame is provided with a bore 25 generally centrally thereof, through which a tube 26 is slidably mounted. A generally frusto-conical gasket member 27 is mounted in any suitable manner on the upper end of the tube 26 and is provided with a bore 28 extending therethrough in axial alignment with the tube 26. The gasket member may be composed of any suitable resilient material, such as rubber, and is positioned in such a manner that the conical surfaces thereof converge upwardly as illustrated. A washer 29, which may be composed of metal or other suitable material, is affixed to, and preferably made integral with, the tube 26 and forms a seat for the gasket member 27. A helical spring 30 of suitable length surrounds that portion of the tube 26 extending upwardly into the interior of the U-shaped frame 11. The ends of the spring 30 abut the washer 27 and the interior surface of the base member 12 adjacent the bore 25 so as to resiliently urge the tube 26 upwardly into the interior of the U-shaped frame as illustrated in Figs. 1 and 2.

A tubular handle 31 is affixed to the underside of the base member 12 in concentric relation with the bore 25 and tube 26, and is spaced from the tube to enable movement thereof through the handle. A suitable hand grip 32 (Fig. 1) surrounds the handle 31 and is affixed thereto. The lower terminal portion or end of the handle 31 (Fig. 2) abuts a bushing member 33 which in turn is threaded to the tube 26 as indicated at 34, thereby providing a stop means limiting the upper movement of the tube as urged by the spring 30. Threaded to the bushing 33, as indicated at 35, is a hose ferrule or connecting element 36, the lower end of which is formed in a generally step shaped manner to enable engagement thereof with a flexible tube or hose 37, for example the inlet tube of a pressure gauge device.

As will now be apparent, the installation of the coupling adapter to provide a fluid-tight linkage may be readily accomplished as described below with reference to Fig. 3. The adapter is gripped by an operator, and the frusto-conical gasket member is placed against the open end of a pipe union assembly, such as indicated generally at 38; a force is then exerted upwardly on the grip and handle serving to compress the spring 30 until the lower surfaces of the pin flanges 19 and 20 clear a suitably provided washer 39 and the upper surface of a union flange 40. With the U-shaped frame disposed in this position, the open end of the pipe union assembly is pressed into a fluid-tight connection with the resilient gasket member 27. The pins 17 and 18 are then pushed inwardly until the flanged surfaces 19 and 20 overlie the union flange 40. With the pins held inwardly in this position, the force on the handle is released and the coupling adapter will then hang in this position without further holding of the pins, and is ready for use.

It will be seen that the coupling adapter is held in its engaged position by friction, the force applied by the spring 30 causing the pins and U-shaped frame to be drawn downwardly into abutting and frictional contact with the union flange. To remove the coupling adapter, it is merely necessary to push upwardly on the handle whereby the spring loaded pins 17 and 18 will again be urged outwardly.

It will now be apparent that a novel coupling adapter is provided in accordance with the present invention, which adapter may be readily engaged and disengaged in a matter of a few seconds and yet, when engaged, forms a highly efficient, fluid-tight connection. In this respect, when employing the adapter in association with a pressure gauge in order to check a gas line in the minimum time and with the maximum of accuracy, it is necessary to first stress test the lines with approximately ten pounds of pressure. This is approximately the maximum pressure which can be used in such a test since a greater pressure will damage the diaphragms of pressure regulators in the gas system. After the stress test, if no leak is apparent, a more sensitive pressure test is normally placed on the line. This test involves employing a pressure of approximately eighteen inches of water, which is effective to indicate even a slight leak on a pressure gauge reading in this range. If a leak does exist it is then necessary again to place a pressure of approximately ten pounds on the line. A gas service man or a plumber then soaps the line until he finds the leak. Thereafter, when the leak has been repaired, the line pressure is again dropped to approximately eighteen inches of water, and, with the aid of the pressure gauge, again tested to see if any other leak exists.

The coupling adapter in accordance with the invention, as previously mentioned, may be readily installed within several seconds, yet has been found to hold pressures at least twice those that may be required, for example in the gas line test above described. Another important feature of the coupling adapter according to the invention is the ease in which pressures on the lines may be released for converting, for example, from pounds to inches of water. Such conversion can be accomplished without necessitating complete disengagement of the coupling means by merely pushing sideways on the handle which serves to release the pressure until that approximately desired is obtained.

While what has been described is considered to be the more advantageous embodiment of the invention, it is obvious that many modifications and variations can be made in the specific design and arrangement of the parts discussed without departing from the spirit and scope of the present invention, as those skilled in the art will readily understand. Such modifications and variations are considered to be within the purview and scope of the invention as defined by the appended claims.

I claim:
1. A coupling adapter comprising a generally U-shaped frame having a base member and a pair of arms extending upwardly at generally right angles therefrom, each of said arms having a bore adjacent its free end and said base member having a bore generally centrally thereof, a pair of pins one of which is slidably mounted in each of the arm bores, means resiliently urging said pins radially outwardly to a position in which they are substantially completely withdrawn from the interior of said frame, each of said pins being provided with stop means on its inner end effective, when said pin is in its normal withdrawn position, to prevent further outward movement thereof, a tube slidably mounted in the bore through said base member, means resiliently urging said tube upwardly into the interior of said U-shaped frame, and a generally frusto-conical gasket member seated on the upward extremity of said tube, said gasket converging upwardly and having a bore extending therethrough in axial alignment with said tube.

2. A coupling adapter comprising a generally U-shaped frame having a base member and a pair of arms extending upwardly at generally right angles therefrom, each of said arms having a bore adjacent its free end and said base member having a bore generally centrally thereof, a pair of pins one of which is slidably mounted in each of the arm bores, means resiliently urging said pins radially outwardly to a position in which they are substantially completely withdrawn from the interior of said frame, each of said pins being provided with stop means on its inner end effective, when said pin is in its normal withdrawn position, to prevent further outward movement thereof, a tube slidably mounted in the bore through said base member and having a radial projection adjacent the lower extremity thereof, means resiliently urging said tube upwardly into the interior of said U-shaped frame, a generally frusto-conical gasket member seated on the upward extremity of said tube, said gasket converging upwardly and having a bore extending therethrough in axial alignment with said tube, a tubular handle affixed to the underside of said U-shaped frame, said handle extending downwardly therefrom in concentric, spaced relation with said tube, and terminating short of the lower extremity thereof, the bottom of said handle being in abutting relation with said tube projection when said tube is in its most upwardly extending position.

3. A coupling adapter in accordance with claim 2 in which said tube projection comprises a bushing affixed to the lower extremity of the tube, and includes a coupling element affixed to and extending downwardly from said bushing.

No references cited.